2,813,056
Patented Nov. 12, 1957

2,813,056

OLIGODYNAMIC SILVER SOLUTION AND PROCESS OF RENDERING A SURFACE MICROBICIDAL

Fred W. Davis and Thomas A. Stokes, Jr., Lake Worth, Fla., assignors, by mesne assignments, to A. O. Edwards, Palm Beach, Fla.

No Drawing. Application March 29, 1955, Serial No. 497,804

14 Claims. (Cl. 167—14)

This invention relates to a method useful in treating articles to render them microbicidal to microorganisms coming into contact with them, particularly to a method for depositing on an article, from a single solution, an intimate mixture of a sparingly water-soluble silver compound in germicidally active form and of a substantially water-insoluble compound of a metal other than silver which is effective in protecting the silver salt from the action of light normally tending to discolor it. This application is a continuation-in-part of application Serial No. 468,524, filed November 12, 1954.

The treatment of articles, such as those made of synthetic organic plastic, paper, leather, textiles, felt and other fibrous and non-fibrous products, to impart microbicidal properties to them whereby they would be lethal over long periods of time to bacteria and fungi coming into contact with them has long presented a problem for which no entirely satisfactory process has heretofore been disclosed. It is known that such articles, especially paper, fabrics and other cellulosic fibrous articles, can be impregnated or treated with certain types of microbicidal agents to maintain them in a sterile condition for short periods of time. A number of conventional germicides and fungicides have been proposed for such purposes. Bandages supporting germicides on the fibers and in the interstices between the fibers have been prepared which could be stored in the open air without becoming unduly contaminated with microorganisms and which could be applied subsequently to open wounds without danger of carrying air-borne infections into the wound. Such heretofore known processes have, however, not been entirely satisfactory for a number of reasons and have not been used on a wide scale.

Most of the attempts made heretofore to render articles microbicidal have been confined to the treatment of bandages, surgical gauze and similar fibrous articles for the reason that such articles must of necessity be maintained in a strictly sterile condition until such time as they are used. There are many other instances, however, where the provision of an article which has been treated in such a way as to render it more or less permanently toxic to bacteria and fungi coming into contact with its surface would be highly advantageous. Not only would a treatment whereby this could be accomplished easily and economically be of value in connection with health problems to prevent the spread of disease and the like by the handling of such articles by different persons, but the avoidance of the deteriorating and destructive effects of the microorganisms on the articles themselves leading to molding, mildew, decay and the like would be avoided. The large annual loss, in terms of money, of cellulosic and other products subject to decay from bactericidal or fungicidal causes is well known.

It is apparent that, to be of more than limited applicability in restricted fields, a process for treating articles to render them microbicidal must of necessity be such that the article retains its microbicidal properties as nearly permanently as possible. In particular, treated articles to be used out of doors should not lose their microbicidal properties by exposure to sunlight, rain and other weather conditions. Articles which must be cleaned and laundered frequently should not lose their microbicidal properties during cleaning or laundering. In addition, there are certain aspects relating to the appearance of the treated article which must be taken into account. Any treatment which changes the color or weight of the article, e. g., of a fabric or paper, or which otherwise alters its appearance would obviously be unsatisfactory in many instances. Not only should the appearance of the article suffer as little change as possible during the actual treatment, but any subsequent change in appearance even after long storage or use should be avoided as much as possible. Odorous substances cannot be tolerated in a majority of instances. It is thus apparent that the problem involved is highly complex and that a simple, inexpensive method for accomplishing the purposes outlined, while at the same time avoiding in great measure the difficulties mentioned, is not to be found readily.

The many attempts which have been made to accomplish the desirable results referred to are known in the art and need not be reviewed here. In particular, however, attention is directed to the numerous attempts which have been made to utilize silver compounds in the treatment of articles to give them microbicidal properties, especially bactericidal properties. The effective bactericidal properties and the generally non-corrosive nature of many types of silver compounds would indicate that these substances should find utility in this field. Little success has been attained, however, in such utilization of silver compounds because of their almost universal property of becoming colored when exposed to light over a period of time. White fabrics, for example, treated or impregnated with silver salts by most of the known methods acquire a greyish, bluish or even a darker shade of color after exposure to the light. Most colored articles when so treated suffer a distinct change in shade upon exposure to light. Such shades are often particularly displeasing to the eye and, of course, no change in color can be tolerated when a permanently uncolored article is desired.

In United States Patent No. 2,689,809 there is described and claimed a process for treating articles to form on the surfaces thereof a tightly adherent, germicidal, co-precipitated coating or deposit of a substantially water-insoluble silver halide or phosphate and a substantially water-insoluble salt of a metal other than silver. The latter salt functions, presumably because of its intimate admixture with the silver salt, as an effective stabilizer of the silver salt against the effect of light normally tending to discolor it. The process of U. S. Patent No. 2,689,809 is effected by first wetting the article which is to be treated with a first aqueous solution comprising a water-soluble silver salt and a water-soluble salt of a metal other than silver. In a typical instance the first solution contains silver nitrate and barium nitrate. The article is subsequently wetted with a second aqueous solution which comprises a water-soluble halide or phosphate and a water-soluble salt, which may also be a phosphate, the anion of which forms a water-insoluble compound with the cation of the metal other than silver in the first solution. In a typical instance the second solution contains sodium chloride and sodium phosphate. The second solution also contains a water-soluble basic nitrogen compound, such as ammonia or an amine, an aqueous solution of which is capable of dissolving the water-insoluble silver compound, e. g. silver chloride. The article is then treated, e. g. dried, to remove the free basic nitrogen compound.

By this procedure there is deposited on the article a co-precipitated mixture of a silver halide or phosphate and another water-insoluble compound comprising the cation of the metal other than silver from the first solution and an anion of a salt from the second solution. In the typical instance referred to, the co-precipitate comprises silver chloride and barium phosphate.

This process, however, suffers from certain disadvantages. There is left deposited on the surface of the article, along with the desired co-precipitate, the water-soluble compounds resulting from the reactions of the constituents of the two solutions to form the co-precipitated salts. In the above typical instance sodium nitrate is left deposited on the article along with the co-precipitate. Inasmuch as the first solution must contain at least two species of anions, there are often a number of different water-soluble substances remaining on the surface of the article after drying. These soluble substances must, in many instances, subsequently be removed from the treated article by washing, which adds considerably to the complexity and cost of the process.

In addition, it is apparent that, since the article is wetted first with the solution containing a soluble silver salt and later on with the second solution containing a basic nitrogen compound, and since the latter effectively retards or even prevents precipitation of the insoluble silver salt on the article until at least a considerable proportion of the basic nitrogen compound has been removed from the wetted article by evaporation or by other means, there will be a considerable tendency for the soluble silver salt contained in the portion of the first solution which adheres to the article to be leached from the article by the second solution and thus to be removed effectively from the zone of co-precipitation so that it becomes ineffective insofar as treating the article is concerned. This difficulty is particularly noticeable when the wetting operations are carried out by dipping the article in the respective solutions, a considerable proportion of the silver originally in the first solution appearing eventually in the second solution from which it must be recovered for reuse.

It is also apparent that the process has certain practical limitations because of the necessity of having both the first and second solutions remain clear prior to use. For this reason, no anions of a water-insoluble silver salt can be included in the first solution and no mixture of cations and anions of a salt which is insoluble in the aqueous basic nitrogen compound of the second solution can be included therein. Besides restricting undesirably the choice of the various compounds which can be used in the process, these limitations also increase the number of substances which must be employed in the process over the number which would appear to be required if a more favorable process were known.

It is apparent that any process which would produce a treated article substantially the same as or superior to that produced by the process of U. S. Patent No. 2,689,809, but which would at the same time be less costly to operate and which would overcome at least some of the disadvantages of the process which have been noted, would be of great value.

In the parent application referred to previously there is disclosed and claimed a process whereby, under certain conditions of operation, an article, such as those mentioned previously, can be treated to form on it a sparingly water-soluble silver salt which, because of the treating conditions employed, not only imparts bactericidal properties to the article but also remains resistant to discoloration by light even without the co-precipitation along with it of a substantially water-insoluble salt of a metal other than silver. As disclosed in the parent application, this result is accomplished by wetting the article being treated with a single treating solution containing ionic constituents of the desired sparingly water-soluble silver salt and a water-soluble basic nitrogen compound in certain essential relative proportions to one another. According to the method of the parent application, the treating solution contains a considerable excess of anions, e. g. chloride anions, of the sparingly water-soluble silver salt which is to be deposited over that required to combine with all of the silver in the solution to form the sparingly water-soluble silver salt and also an amount of the basic nitrogen compound at least greater than that required to prevent precipitation of the sparingly water-soluble silver salt in the treating solution and also on the wetted article until such time as the basic nitrogen compound is at least partially removed, e. g. by volatilization. In a typical instance involving the treatment of paper, a mixture of silver nitrate and sodium chloride is dissolved in aqueous ammonia to form a solution containing about 2.26 molecular proportions of sodium chloride and about 82 molecular proportions of ammonia for each molecular proportion of silver in the solution. The paper is wetted with the solution and then dried.

The process of the parent application just described has certain obvious advantages over the process of U. S. Patent No. 2,689,809, an important one of which is the employment of a single treating solution rather than a plurality of solutions. Although the treated product thus prepared is adequately resistant to discoloration by light for most purposes when certain silver salts are employed, it has been noted that the variety of silver salts which may be employed is sometimes dependent to some extent upon the conditions to which the treated article is to be submitted if complete freedom from the development of color is desired. This restricts to a certain degree the utility of the process both as to the particular sparingly water-soluble silver compound which can be employed and as to the particular use which can be made of the treated product. In addition, it is obvious that, if the chloride ion in the instance noted is present in the solution in an amount more than that equivalent chemically to the silver therein, it will be impossible to avoid deposition on the treated article, along with the silver chloride, of other substances, e. g. sodium nitrate and the excess of the sodium chloride itself. In some instances the presence of such substances in or on the treated article is undesirable. This necessitates an additional washing operation. It is, therefore, desirable to provide a process for treating an article to render it microbicidal which will embody not only the employment of a single treating solution and other advantages of the process of the parent application, but also the advantages of the process of U. S. Patent No. 2,689,809.

It has also been disclosed in the parent application that under certain circumstances it is desirable to include in the single treating solution, along with the basic nitrogen compound and the ionic constituents of the sparingly water-soluble silver compound, a zinc compound which is soluble in the solution and which, when an article is wetted with the solution and then dried to remove the basic nitrogen compound, results in the deposition on the article along with the silver compound of a substantially water-insoluble zinc compound. It is pointed out in the parent application that an article treated in this manner and having deposited on it both the silver compound and the zinc compound is more resistant to discoloration by sulphur-containing fumes and vapors than is the same product except with the zinc compound omitted. It is thought that this effect may be due, at least in part, to the preferential formation of white zinc sulfide when the article is exposed to sulphur-containing fumes and that the formation of dark-colored silver sulfide is thereby repressed.

It has now been found that the disclosure in the parent application of the inclusion of a zinc compound in the treating solution is but one example of a hitherto undisclosed process for treating an article to render it microbicidal which embodies substantially all of the advantages of the process of the parent application and of that of U. S. Patent No. 2,689,809, but which is substantially free of the disadvantages of both of these processes. The new process is characterized by the employment of a single treating solution and by the deposition on the article not only of a sparingly water-soluble silver compound but also of a suitable substantially water-insoluble compound of a metal other than silver of a character and in an amount which renders the treated article fully as resistant to discoloration by light as that produced by either of the previous processes referred to. The process can also be carried out, if desired, in such a manner that the treated article is substantially free, even without washing, of deposited substances other than the desired silver compound and the desired compound of the metal other than silver.

According to the process of the present invention, an article which it is desired to render microbicidal to microorganisms coming into contact with it is wetted with a single aqueous solution comprising a water-soluble basic nitrogen compound and substances furnishing ionic constituents of a sparingly water-soluble silver compound and of a substantially water-insoluble compound of a metal other than silver, both of which compounds are soluble in the aqueous basic nitrogen compound. The basic nitrogen compound is then removed from the wetted article, e. g. by drying to volatilize the nitrogen compound, leaving deposited thereon a co-precipitate of the sparingly water-soluble silver compound and of the substantially water-insoluble compound of the metal other than silver, the latter functioning effectively to protect the silver compound from the action of light normally tending to discolor it.

Insofar as is known, the employment in the treating solution of any significant excess of the ionic constituent of the sparingly water-soluble silver salt over that required to combine with all of the silver in the solution is generally unnecessary and, for economic reasons, is often undesirable. Inasmuch as the sparingly water-soluble silver salt and substantially water-insoluble salt of the metal other than silver which it is desired to deposit on the article being treated are both soluble in the aqueous basic nitrogen compound employed, it thus becomes possible, and often desirable, to employ these two substances themselves in making up the treating solution rather than to employ other compounds containing the proper ionic constituents to form the two deposited substances.

This often simplifies the procedure considerably since all that is required in such an instance to make up the solution is to dissolve the two desired substances in the desired proportions and amounts in the aqueous basic nitrogen compound containing sufficient of the latter to insure the formation of a clear solution and to then apply the solution on the article being treated, e. g. by dipping, padding, spraying or in any other convenient way. The article is then dried, or treated in any other convenient way to effect the removal of basic nitrogen compound from it, whereupon there remains deposited on the article the sparingly water-soluble silver compound and the substantially water-insoluble compound of the metal other than silver in the proportions used in making up the treating solution and in amounts depending upon the concentrations thereof in the solution and the amount of solution retained by the wetted article. Under such conditions the deposit is substantially free of other substances.

The invention is, however, not limited to the simplified procedure just described but, as previously mentioned, contemplates the utilization in making up the treating solution of any suitable substances furnishing the desired ionic constituents, provided only that the mixture of substances used is soluble in the aqueous basic nitrogen compound to provide a clear solution. The following illustrate, but do not limit, the variety of substances which can be dissolved in water to form a treating solution in accordance with the present invention. Certain of the illustrations given include a fungicidal substance, according to a modification explained later on herein.

| Solution | Dissolved Substances |
| --- | --- |
| A | ammonia. silver nitrate. zinc chloride. sodium phosphate. |
| B | ammonia. silver nitrate. sodium bromide. zinc chloride. potassium phosphate. |
| C | ammonia. silver chloride. zinc phosphate. |
| D | diethylamine. silver chloride. zinc phosphate. |
| E | ammonia. silver nitrate. cadmium chloride. sodium oxalate. |
| F | ammonia. silver nitrate. sodium thiocyanate. zinc phosphate. |
| G | ammonia. silver thiocyanate. cuprous thiocyanate. |
| H | ammonia. silver chloride. ammonium undecylenate. sodium phosphate. zinc chloride. |
| I | ammonia. silver chloride. zinc undecylenate. zinc oxalate. |
| J | ammonia. silver nitrate. zinc chloride. disodium bis-(5-chloro-2-hydroxyphenyl)-methane. potassium phosphate. |

A wide variety of basic nitrogen compounds are suitable for inclusion in the treating solution. For practical reasons, and because of a large excess of the basic nitrogen compound over that required to form the silver ammino cation is used, the preferred basic nitrogen compound is selected from the group consisting of ammonia and the water-soluble aliphatic amines. Aliphatic amines which are satisfactory for use include methyl amine, diethyl amine, tributyl amine, hexyl amine and the like. Insofar as is known, any aliphatic primary, secondary or tertiary amine which is soluble in water and which forms a water-soluble silver complex compound can be used, especially those having alkyl radicals with not more than six carbon atoms in the radical. For economic and other reasons, the basic nitrogen compound employed is generally ammonia, although the invention is not thus limited.

As indicated previously, substantially any silver salt can be used as the source of silver in preparing the first solution, due regard being given, of course, to any adverse effects which the anion of the particular compound employed might have on the particular article being treated. Thus, for example, it is known that the chromate ion is yellow and the use of silver chromate as the starting salt should be avoided when all color is to be avoided. The anions of certain other silver salts, e. g. the chlorate and perchlorate anions, are strong oxidizers and their use should be avoided when an oxidizing action would affect the article adversely. Aside from such considerations, however, the choice of silver compound which can be employed as a source of silver is practically unlimited so long as the compound is soluble in an aqueous solution of the basic nitrogen compound employed. Such silver compounds include the highly water-soluble silver salts such as silver nitrate, silver perchlorate, silver fluoride and the like; the moderately or slightly water-soluble silver salts, such as silver sulfate, silver propionate, silver acetate, silver chlorate and the like; and the normally substantially water-insoluble silver salts, such as silver chloride, silver bromide, silver phosphate, silver undecylenate, silver chromate, silver dichromate, silver cyanide, silver thiocyanate, silver benzoate, silver citrate and the like.

The compound utilized for furnishing the anions of the sparingly water-soluble silver compound should, of course, be selected according to the nature of the actual silver compound which it is desired to co-precipitate on the article, due regard being given to its color, solubility in water and the like. Thus, it has been noted that silver sulfide, which is soluble in water to the extent of about 0.00002% by weight, appears to be insufficiently soluble to exert any appreciable bactericidal effect. This may be related to the low degree of ionization of the sulfide. On the other hand, the solubility of silver sulfate, which is soluble in water to the extent of about 0.5%, appears to be such that if this compound is deposited as the sparingly water-soluble silver salt, it is readily removed by leaching after a few launderings or washings with hot water. For these reasons, the sparingly water-soluble silver compound which is co-precipitated on the article being treated is herein defined as a compound having a solubility in water at least about as great as that of silver sulfide but less than about that of silver sulfate.

It also appears that there may possibly be some correlation between the actual solubility in water of the silver compound deposited and its light sensitivity, the more soluble compounds within the range given, such as silver orthophosphate, being somewhat more prone to become discolored by light than the less soluble compounds, such as silver chloride, even though there is little, if any, difference in germicidal effectiveness imparted to the treated article. It may also be that the size and complexity of the anion of the silver salt deposited is a factor in the light stability of the deposit. Regardless of such considerations, the preferred silver compound which is deposited when a high degree of color stability is desired is, for economic and other reasons, silver cyanide, silver thiocyanate, silver chloride or silver bromide. Of these, the chloride and thiocyanate are generally preferred.

The compound used in the treating solution to furnish the cations of the substantially water-insoluble salt of a metal other than silver can be any one of a wide group of metal compounds having salts which are soluble in aqueous basic nitrogen compounds, due regard, of course, being given to any color being imparted to the article by such compounds. When a non-colored co-precipitate is desired, suitable compounds include those of zinc and cadmium. Of these and other suitable non-colored compounds, those of zinc are often preferred because of their ready availability and, as will be pointed out later, because of their fungicidal nature. The specific compound of the metal chosen is relatively unimportant provided it is soluble in the aqueous basic nitrogen compound and provided it does not react with other constituents of the solution to form a substance insoluble therein. Suitable salts include the nitrate, sulfate, oxalate, chloride, bromide, acetate, phosphate, silicate, undecylenate and the like, as well as phenolates and substituted phenolates.

Generally speaking, the compound utilized to furnish the anions of the substantially water-insoluble salt of the metal other than silver is selected from the group consisting of phosphates, silicates, oxalates and the like, depending, of course, upon the particular insoluble salt desired and also upon the particular metal cation employed. Substantially any salt soluble in the aqueous basic nitrogen compound can be employed which furnishes the desired anion. Such salts include sodium, potassium, ammonium, substituted ammonium and other suitable soluble compounds.

The treating solution can be prepared in any convenient manner. Generally speaking, it is found satisfactory to first dissolve the basic nitrogen compound in water and to then add the remaining ingredients of the solution in any desired order either with or without first dissolving them in water. The mixture should be stirred before use until free of undissolved substances.

It is impossible to define with any degree of exactness either the concentrations of the various soluble substances in the treating solution or the amount of the solution generally employed in treating an article. It is apparent that the amount of solution which can be retained by a given article will depend to a great extent upon the nature of the article and upon its prior treatment. Fibrous articles, such as fabrics and paper, may frequently retain from as little as 25% or less to as high as 100% or 200%, or even more, of their dry weight of solution, depending upon the amount of solution used and the degree of draining or squeezing of the article effected following the wetting operation. Articles having relatively nonabsorbent surfaces, such as many solid articles, may retain only enough solution to wet their surfaces. Generally speaking, the concentration of silver in the solution and the rate of application of the solution are controlled so that the treated article, if a cellulosic fibrous article, contains from about 0.002% to about 0.1% of its dry weight of the sparingly water-soluble silver compound, calculated as silver chloride. However, higher or lower proportions of the silver compound can be deposited if desired.

The proportion of sparingly water-soluble silver compound deposited in the co-precipitate is also subject to considerable variation without departing from the spirit of the invention. Here again it is impossible to give any definite proportions which will include all cases because of the varying natures of the articles which can be treated and because of the varying proportions of the insoluble salt of the metal other than silver which may be required to be in the co-precipitate to effectively shield the silver compound from the action of light. The conditions under which the article is to be used are also factors.

Generally speaking, however, the proportions of the soluble substances in the solution are adjusted so that the co-precipitate contains from about one-half to about twenty-five times as much by weight of the compound of the metal other than silver as it does of the silver compound, although these proportions are not to be taken as limiting.

For most economical operations the concentrations of the several ionic species in the solution are such that the cations and anions of the sparingly water-soluble silver salt and of the substantially water-insoluble salt of the metal other than silver are present in approximately the stoichiometric proportions in which they combine to form these compounds. It may in some instances be advisable, but is by no means always necessary, to include in the solution a moderate excess of the anions of the sparingly water-soluble silver compound to insure the most economical utilization of the silver. It also appears that under such conditions the sparingly water-soluble silver compound is sometimes deposited in a form which is somewhat more light stable than when only a chemically equivalent proportion of the anion with respect to the silver is employed.

The basic nitrogen compound is included in the solution at a concentration which is somewhat dependent upon the particular co-precipitate which is to be deposited on the article being treated and, to some extent, upon the actual concentrations of the soluble substances in the solution. Insofar as is known, no excess of basic nitrogen compound need be employed over that required to provide a clear solution and thus to insure an even and uniform co-precipitate on the article. Generally speaking, somewhat more than the minimum necessary amount of basic nitrogen compound is generally employed as a precautionary matter, but this is not thought to be necessary.

It is known that silver salts have a certain degree of fungicidal value, especially against certain types of fungi. It is thus possible in employing the process of the invention to produce treated products which are not only bactericidal but which are also fungicidal to a marked degree.

This often requires the deposition on the article of a greater proportion of the sparingly water-soluble silver salt than would otherwise be necessary if only bactericidal effects were desired. In view of the cost of silver and its compounds, this is not always desirable and, furthermore, fungicidal properties of the sparingly water-soluble silver salts are such that adequate protection against all types of fungi under the conditions most favorable for their growth may not always be obtained. For this reason, a preferred modification comprises inclusion in the treating solution previously described of a fungicidal compound which is soluble therein and which, during the operation of the process, leads to the deposition on the surfaces of the article, along with the silver-containing co-precipitate, of a sparingly water-soluble substance having fungicidal properties.

In a preferred modification, the fungicidal compound incorporated in the treating solution is one which furnishes fungicidal organic anions. Such a compound can be added in an amount greater or less, on a chemically equivalent basis, than the amount of silver compound in the solution as may be required for optimum results. The compound furnishing fungicidal organic anions is generally used in addition to the previously described requisite amount of compound furnishing the halide or other inorganic anions of the sparingly water-soluble silver compound. In certain instances, the proportion of the latter can be reduced to a limited extent when a compound furnishing fungicidal organic anions is included in the solution, but such possible reduction is not generally significant.

Although the exact nature of the deposit obtained on the article when a compound furnishing fungicidal organic anions is included in the treating composition is not known with certainty, it appears that at least a part of the fungicidal anions which are retained on the surfaces of the article are sometimes in the form of a silver salt containing the anions. However, it does not appear that all of the silver in the deposit is generally present in this form, even when the amount of fungicidal organic anions retained on the article is equal to or greater than the amount chemically equivalent to the silver retained. It may be that, when using a compound furnishing fungicidal organic anions in the solution, an equilibrium is established, insofar as the deposit is concerned, between a silver compound containing the fungicidal anions and the sparingly water-soluble silver compound previously referred to, e. g., silver chloride, and that the deposit consists of a mixture of the two compounds. It may, also, be that, in part, the same type of relationship just mentioned as possibly existing between the fungicidal anions and the silver exists between the fungicidal anions and the metal other than silver. Under such conditions, the proportions of the several compounds in the deposited mixture depend, of course, upon a number of factors, including their relative solubilities and the rates of change of their solubilities in solutions of decreasing basic nitrogen compound content, e. g., during the drying step, as well as upon the actual ionic concentrations prevailing in the treating solution. Regardless of theory, the preferred modification leads to the production of a treated article which is both highly bactericidal and highly fungicidal. Generally speaking, the fungicidal qualities of the treated product are somewhat more easily destroyed by repeated washing and laundering than are the bactericidal qualities but they are, nevertheless, adequate for most purposes.

Fungicidal compounds which can be included in the solutions for the purpose of fiurnishing sparingly water-soluble compounds having fungicidal organic anions include compounds, e. g., salts, of fungicidal organic acids and of fungicidal phenols and halo-phenols which are soluble in the solution. Compounds of fungicidal organic acids which can be employed include compounds of benzoic, salicylic, propionic, caproic, caprylic, pelargonic, undecylenic, hexanoic, sorbic and many other acids. Preferred compounds of fungicidal acids are the alkali metal and the basic nitrogen compound salts of the saturated and unsaturated aliphatic acids, particularly of undecylenic acid. Compounds of phenols and halo-phenols which can be employed are the sodium, potassium, lithium and basic nitrogen compound salts of such phenolic substances as the mono- and poly-chlorophenols, the phenylphenols and their halogen substitution products, the hydroxy- and halo-hydroxydiphenylmethanes, thiophenols and the like. Because of their ready availability and ease of handling in the process, the sodium and other alkali metal salts of bis-(5-chloro-2-hydroxyphenyl)-methane, bis(2-hydroxy-3,5-dichlorophenyl)-sulfide and related halophenols and halothiophenols are of particular value in the operation of the process. This preferred modification of the invention in its broadest aspect, however, includes the employment in the treating solution of substantially any compound furnishing a sparingly water-soluble compound comprising fungicidal organic anions when the basic nitrogen compound is removed as described previously.

The manipulative procedure employed in carrying out the process when a compound furnishing fungicidal organic anions is employed in the solution does not vary appreciably from the procedure employed when such a compound is not employed. The compound furnishing fungicidal anions should, of course, be compatible in the solution with the other substances therein. Because of the generally somewhat lower degree of stability of the compounds in the deposit containing the fungicidal organic anions, as compared with the stbility of the sparingly water-soluble silver compound, it is generally desirable to avoid drying operations wherein the treated product is heated above about 150° C. to avid volatilization of compounds containing an appreciable proportion of the fungicidal organic anions.

Although the invention has been described as involving the co-precipitation of a sparingly water-soluble salt together with other substances on the surface of an article being treated, it is pointed out that such description is in no wise limiting. The mode of action of the silver salt and the reasons therefor are not clearly understood. It may be that a certain amount of the ionic constituents of the treating solutions penetrate into the interior of fibers, e. g., into the lumens of cellulosic fibers, or at least a sufficient distance below the surface of individual fibers or of non-firous articles and that actual formation of the sparingly water-soluble silver salt, together with other sparingly water-soluble substances, occurs in such locations where they are effectively retained mechanically and thus are not subject to removal by ordinary washing processes. It may be also, particularly in the case of cellulosic articles, that a certain amount of silver is actually retained as a result of reactions involving carboxyl radicals which are known to exist either as a part of or associated with the cellulose molecule. The present invention, however, is not concerned with such theoretical aspects and contemplates the procedures given and the results obtained, regardless of the precise reason therefor.

Although the invention has been described with particular reference to cellulosic fabrics and paper, it is pointed out that it is concerned as well with the treatment of other cellulosic and non-cellulosic fibrous and non-fibrous articles and with the treated products which result. Thus, wood pulp can be treated by the process of the invention to protect it from deterioration during storage, the microbicidal activity of the fibers generally persisting through the paper-making process so that paper made from the treated pulp embodies desirable microbicidal features. Other cellulosic substances which can be treated similarly with advantageous results, either in bulk fibrous form or in the form of articles manufactured from the fibers include linen, hemp, jute and the like.

Many synthetic fibers, such as rayon, acetate, nylon and the like, and articles fabricated therefrom, can also be treated by the process advantageously. Certain modifications of the process can be employed in treating wool and other fibrous substances of animal origin.

The invention is not confined to the treatment of fibrous substances but relates as well to the treatment of moderately porous and substantially non-porous articles to render their surfaces lethal to microorganisms coming in contact with them. Such articles include those of wood, rubber, synthetic plastics and the like. Powdered materials such as pigments, dentifirice powders, talcum and dusting powders and many others can likewise be treated by the process to give products which, in addition to their normal function, exhibit effective germicidal and, if desired, fungicidal properties. By proper modifications of the process, it can be applied to the preparation of ointments, lotions and other semi-solid paste compositions.

Although the invention has been described in the treating of an article which it is desired to render both germicidal and fungicidal with particular reference to the employment of a compound furnishing fungicidal anions to impart the fungicidal properties, it should be pointed out that the invention contemplates, as well, instances wherein a compound furnishing a fungicidal cation and soluble in the aqueous basic nitrogen compound is included in the solution under conditions which lead to the deposition on the article being treated of a substantially water-insoluble compound containing the cation in fungicidally active form. Such fungicidal cations include zinc, copper and other fungicidal metal cations. A compound furnishing a suitable anion for the formation on the article of a substantially water-insoluble compound of the fungicidal metal cation is also included in the solution. Here again, the insoluble compound containing the fungicidal cation can itself be dissolved in the solution, if desired, rather than compounds furnishing the cations and anions separately.

In the case of zinc compounds, the resulting treated product is generally uncolored by the treatment because suitable non-colored compounds of zinc, such as the phosphate, silicate, oxide and the like, can be employed. When copper is employed as the fungicidal cation, the treated article is generally colored by the copper salt deposited on it. However, cuprous thiocyanate and other substantially water-insoluble copper salts which are essentially white or uncolored can be deposited along with the sparingly water-soluble silver salt and the advantageous fungicidal characteristics of copper imparted to the article along with the bactericidal characteristics of the silver compound. The employment of a zinc compound when an uncolored product is desired is especially advantageous because it can also be used in its dual purpose of fungicidal agent and protective agent for the silver salt. The same is true of cuprous thiocyanate, especially where the product is to be used under essentially non-oxidizing conditions.

In view of the fact that certain otherwise desirable substantially water-insoluble compounds of metals other than silver are insoluble in aqueous basic nitrogen compounds, it is frequently advantageous to incorporate in the treating solution described previously a soluble salt or compound which changes the solution environment to such an extent as to enable it to dissolve the otherwise desirable substance. Thus, calcium sulfate, which is insoluble in aqueous ammonia, can be dissolved in the treating solution if there is also incorporated therein an adequate proportion of a soluble ammonium salt, such as ammonium chloride. A suitable treating solution according to this embodiment of the invention can be made by dissolving appropriate proportions of ammonium chloride, silver sulfate, calcium chloride and ammonia in water.

It is, of course, apparent that agents, such as surface active agents and the like, can be included in the treating solution to facilitate operation of the process according to the known effects of such substances. In some instances it may be desirable to include suitable sizing materials, such as starch and emulsified resinous substances, in the solution to effect sizing of the article during the treating process. In certain instances it appears that the use of such substances facilitates to some extent the retention of the co-precipitate by the article and thus increases its resistance to removal by repeated laundering.

Certain advantages of the invention are apparent from the following examples, which are given by way of illustration only and are not to be construed as limiting.

In the accompanying examples the bactericidal and fungicidal effectiveness of the treated specimens of paper or fabrics were determined by a modified agar plate method. In the method a circular test disk precisely 15 millimeters in diameter was cut from the treated sheet of paper or fabric and placed flat in contact with the surface of a sterile agar plate freshly inoculated on its surface with the test organism. After incubation, the plate was inspected. The presence of a narrow ring around the test disk free of growing organisms was interpreted as showing the toxicity of the treated disk to the organism involved. In view of the essentially insoluble nature of the microbicidal substance on the test disk, its diffusion into the agar was in all cases limited and the actual width of the ring around the disk was of little significance. When an actual measurement was recorded, it was that of the total diameter of the ring, including the 15 millimeter diameter of the test disk.

*Example 1*

An aqueous solution was prepared by dissolving 10 grams of zinc phosphate crystals (7.8 grams of actual zinc phosphate) and 1.0 gram of silver chloride in 50 milliliters of 28 percent aqua ammonia. The clear solution was diluted with nine times its volume of water.

Pieces of white cotton and woolen cloth were dipped in the diluted solution, squeezed to remove easily drained solution and then dried. The dried fabrics remained uncolored after prolonged exposure to sunlight and were bactericidal and fungicidal when tested on agar plates.

*Example 2*

One liter of an aqueous solution was prepared containing 1.0 gram of silver chloride, 10 grams of zinc orthophosphate (anhydrous basis) and sufficient 28 percent aqua ammonia (about 50 milliliters) to provide a clear solution.

Samples of white woolen blanketing were wetted thoroughly with the solution and then dried. The dried samples were indistinguishable in color from the untreated blanketing. When stored in the open in the laboratory the treated samples acquired a faint brownish tinge which disappeared when the samples were exposed to direct sunlight. No further color developed upon prolonged exposure to direct sunlight.

Test disks 15 millimeters in diameter were cut from the treated samples and placed on inoculated agar plates and the plates incubated. With *M. aureus* as the test organism, a clear zone 20.0 millimeters in diameter remained around the disk. With *E. coli* as the test organism, the diameter of the clear zone was 17.0 to 19.5 millimeters and with *B. subtilis* it was 16.5 to 19.0 millimeters. The treated fabric was also fungicidal when tested in a similar manner using *T. gypseum* as the test organism. The samples remained microbicidally active after repeated washing in lukewarm soap solution.

*Example 3*

An aqueous solution was prepared by mixing together 50 milliliters of 28% aqua ammonia, 10 grams of a commercial wetting agent (Tergitol NP–40), 8.6 grams of undecylenic acid, 9.95 grams of zinc chloride in the form of a concentrated aqueous solution and 1.19 grams of silver nitrate also in the form of a concentrated aqueous solution. The solution was diluted to ten times its volume with water.

The solution was used for wetting thoroughly knit cotton, cotton twill, cotton shoe-lining and cotton sheeting. The wetted fabrics were then dried. The dried samples were in each case uncolored by the treatment and were bactericidal and fungicidal and resistant to loss of these properties upon exposure to direct sunlight and upon repeated laundering.

*Example 4*

A solution was prepared by dissolving 1.0 gram of silver nitrate and 10.0 grams of zinc undecylenate in 50 milliliters of 28% aqua ammonia and diluting the mixture to one liter with water.

The solution was used for treating cotton knit goods as in Example 3.

*Example 5*

Surgical gauze was wetted thoroughly with an aqueous solution containing 55 milliliters of 28% aqua ammonia, 1.0 gram of zinc nitrate, 1.0 gram of sodium chloride, 1.0 gram of the disodium salt of bis-(5-chloro-2-hydroxyphenyl)-methane and 0.79 gram of silver nitrate per liter. The wetted gauze was then dried and was found to be microbicidal and resistant to discoloration by light.

*Example 6*

One liter of treating solution was prepared containing 50 milliliters of 28% aqua ammonia, 1 gram silver chloride, 5 grams ammonium sulfate, 1 gram calcium sulfate, 10 grams of calcium undecylenate and a small amount of a commercial wetting agent. The solution was used in treating cotton fabric to render it microbicidal.

*Example 7*

A clear aqueous dipping solution was prepared by dissolving together in water 0.00472 mol of silver nitrate, 0.740 mol of ammonia, 0.0053 mol of zinc nitrate, calculated as the anhydrous salt, 0.0214 mol of sodium chloride and 0.0032 mol of the disodium salt of bis-(5-chloro-2-hydroxyphenyl)-methane and diluting the solution to 1 liter with water. Samples of paper and fabric were dipped in the solution, squeezed to remove excess liquid, and dried. The samples did not discolor upon exposure to light and were both germicidal and fungicidal when tested according to the procedure given. The treated samples were less subject to discoloration by sulfide fumes than similarly treated samples prepared without a zinc salt in the treating solution.

*Example 8*

A first solution was prepared containing 64.9 parts by weight of 29.4% aqueous ammonia (18.93 parts actual $NH_3$), 10.5 parts of undecylenic acid, 6.0 parts of zinc chloride, 0.05 parts of a wetting agent (Igepal CO-630 available from Hart Products Corporation), 0.10 part of 35% hydrogen peroxide, and 18.45 parts of water.

A second solution was prepared consisting of 13.1 parts by weight of crystalline silver nitrate and 86.9 parts of water. These solutions were stored separately, without deterioration, for several days.

A padding solution was prepared by mixing 7.5 parts by weight of the first solution and 0.84 part of the second solution with 120 parts of water. The padding solution thus prepared was clear and free of sediment or precipitate. Each 100 grams of the solution contained 0.11 gram (0.0005 mol) of silver compound, 1.0 gram (0.059 mol) of actual ammonia, 0.352 gram (0.00259 mol) of zinc chloride and 0.585 gram (0.00318 mol) of undecylenic acid, calculated as the free acid.

A conventional pad box was charged with the padding solution and kept full by hand charging of additional solution as needed. A variety of styles of dry white and colored cotton fabrics were run through the pad box at a speed of about 60 yards per minute with the bath temperature at 120° F. The fabrics were then run through nip rolls and folded into tote boxes to await drying. The dryer was run at 230° F. and the drying time was approximately five minutes.

The retention of padding solution by the fabrics prior to drying varied from approximately 40% to approximately 65% of the dry weight of the fabric, depending largely upon the type of fabric treated. The finally dried fabrics thus retained from about 0.029 to about 0.046 percent of their weight of silver, calculated as the chloride. The bactericidal and fungicidal effectiveness and the light stability of the treated fabrics were excellent.

We claim:

1. A clear aqueous solution for co-depositing, on the surface of an article, a sparingly water-soluble silver salt to render said surface lethal to bacteria coming in contact therewith and a substantially water-insoluble salt of a metal other than silver to prevent discoloration of said silver salt, said solution having dissolved therein a silver salt, a water-soluble, volatile basic nitrogen compound, a portion of which is combined with the silver of said silver salt to form silver ammino cations, a salt which furnishes cations of said substantially water-insoluble salt of said other metal, a salt which furnishes anions capable of forming a silver salt having a solubility in water from 0.00002 to 0.5% by weight, and a salt which furnishes anions of said substantially water-insoluble salt of said other metal.

2. The solution of claim 1 in which said basic nitrogen compound is ammonia.

3. The solution of claim 1 in which said anions of said sparingly water-soluble silver salt are chloride ions.

4. The solution of claim 1 in which said cations of said substantially water-insoluble salt are selected from the group consisting of zinc and cadmium cations and said anions of said substantially water-insoluble salt are selected from the group consisting of phosphate, silicate and oxalate anions.

5. The solution of claim 1 which contains fungicidal organic anions selected from the group consisting of the anions of fungicidal organic acids, phenols and halophenols.

6. The solution of claim 1 in which the fungicidal anion is the anion of undecylenic acid.

7. The solution of claim 1 in which the fungicidal anion is the anion of bis-(5-chloro-2-hydroxyphenyl)-methane.

8. A process for co-depositing, on the surface of an article, a sparingly water-soluble silver salt to render said surface lethal to bacteria coming in contact therewith and a substantially water-insoluble salt of a metal other than silver to prevent discoloration of said silver salt, which process consists of wetting the surface of said article with an aqueous solution having dissolved therein a silver salt, a water-soluble, volatile basic nitrogen compound, a portion of which is combined with the silver of said silver salt to form silver ammino cations, a salt which furnishes cations of said substantially water-insoluble salt of said other metal, a salt which furnishes anions capable of forming a silver salt having a solubility in water from 0.00002 to 0.5% by weight, and a salt which furnishes anions of said substantially water-insoluble salt of said other metal; and drying the article so-wetted to co-deposit the sparingly water-soluble silver compound and the substantially water-insoluble salt of said other metal on the surface in tightly adherent, bactericidally active form.

9. The process of claim 8 in which said basic nitrogen compound is ammonia.

10. The process of claim 8 in which the anions of said sparingly water-soluble silver salt are chloride ions.

11. The process of claim 8 in which said cations of said substantially water-insoluble silver salt are selected from the group consisting of zinc and cadmium cations and said anions of said substantially water-insoluble salt of said other metal are selected from the group consisting of phosphate, silicate, and oxalate anions.

12. The process of claim 8 in which said solution contains fungicidal organic anions selected from the group consisting of the anions of fungicidal organic acids, phenols, and halophenols.

13. The process of claim 12 in which the fungicidal anion is the anion of undecylenic acid.

14. The process of claim 12 in which the fungicidal anion is the anion of bis-(5-chloro-2-hydroxyphenyl)-methane.

References Cited in the file of this patent

UNITED STATES PATENTS

| | | |
|---|---|---|
| 2,247,339 | Robinson | June 24, 1941 |
| 2,250,390 | Minaeff | July 22, 1941 |
| 2,288,810 | Leatherman | July 7, 1942 |
| 2,459,896 | Schwarz | Jan. 25, 1949 |
| 2,653,893 | Romans | Sept. 29, 1953 |
| 2,689,809 | Fessler | Sept. 21, 1954 |

FOREIGN PATENTS

| | | |
|---|---|---|
| 515,540 | Great Britain | Dec. 7, 1939 |
| 543,948 | Great Britain | Mar. 20, 1942 |

OTHER REFERENCES

Marsh et al.: I. and E. Chem., July 1946, pp. 701–705.